United States Patent
Olson

[15] 3,675,749
[45] July 11, 1972

[54] QUICK DISCONNECT CLUTCH

[72] Inventor: Vernon Olson, 1961 Bartlett Avenue, Milwaukee, Wis. 53202

[22] Filed: Jan. 12, 1971

[21] Appl. No.: 105,857

[52] U.S. Cl. .........................................................192/56 R
[51] Int. Cl. ........................................................F16d 43/20
[58] Field of Search..........................................192/56 R, 150

[56] References Cited

UNITED STATES PATENTS

| | | | |
|---|---|---|---|
| 1,593,732 | 7/1926 | Street | 192/56 R |
| 2,775,327 | 12/1956 | Gearhart | 192/56 R |
| 2,045,572 | 6/1936 | Dow | 192/56 R |
| 2,497,893 | 2/1950 | Linahan | 192/56 R |
| 2,778,468 | 1/1957 | Babaian | 192/56 R |

Primary Examiner—Allan D. Herrmann
Attorney—Alter, Weiss & Whitesel

[57] ABSTRACT

A clutch has two spring biased plates, normally urged together by the spring. Detents on one plate are captured by lugs or latches on the other plate. When a jerk occurs the capture is lost, and the detents move out of their capture position.

7 Claims, 7 Drawing Figures

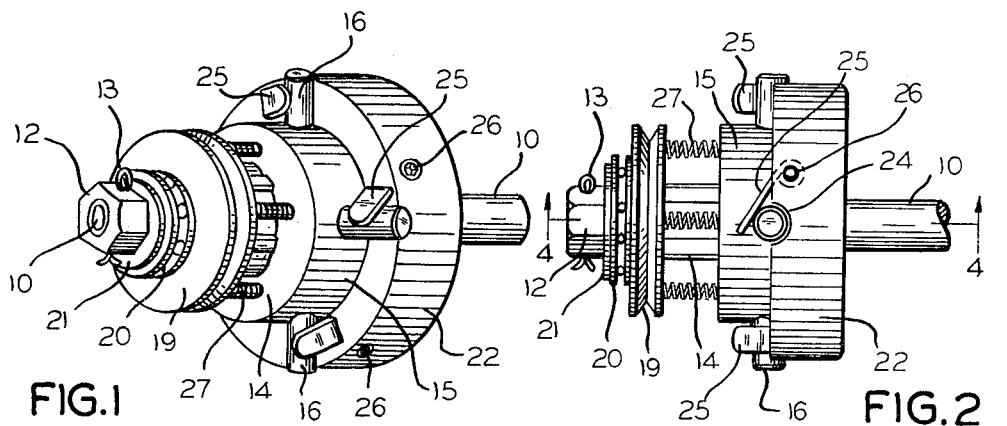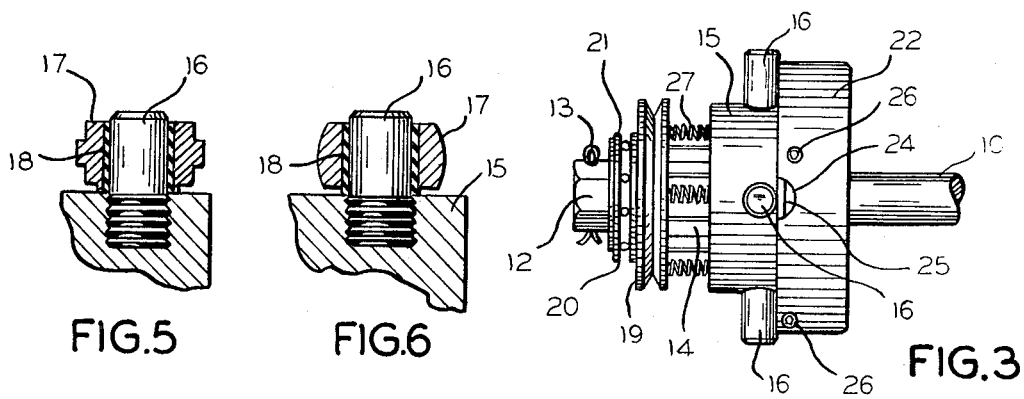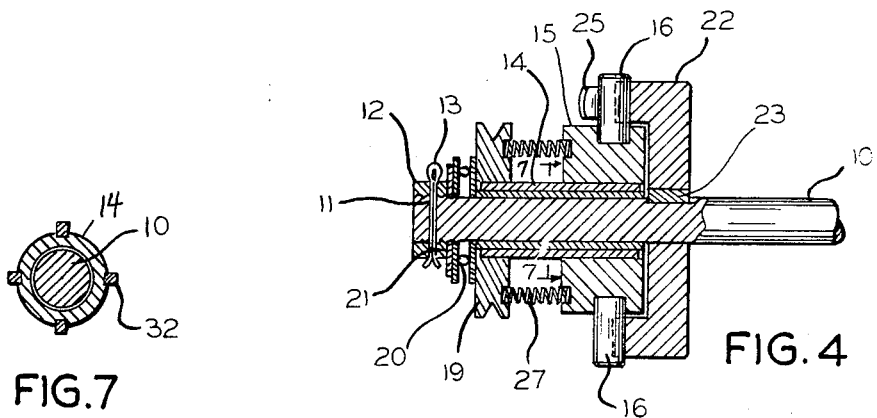
INVENTOR
VERNON OLSON
BY
Alter, Weiss and Whitesel
ATTORNEYS

QUICK DISCONNECT CLUTCH

My invention relates to clutches and more particularly to a safety driving clutch designed for rapid acceleration and quick disconnect.

There are many uses for quick disconnect power couplers or clutches. For example, lathes, drill presses, or other machine tools could encounter a situation wherein a part siezes so that the machinery tends to jerk. This places a sudden load on gears, which could produce a distructive effect. A quick disconnect clutch device removes power and prevents damage to the machine. Thus, the clutch tends to act somewhat as a fuse.

Obviously, this class of machinery is one which cannot support a costly clutch mechanism. Thus, there are the twin needs of quick, fuse-like, power disconnect at a very low cost.

The prime object of my invention is to provide a clutch designed for rapid and positive fuse-like disengagement of power after an emergency.

Another object of my invention is to provide a device of the character described that maintains maximum torque on a drive shaft, with quick disengagement.

Still another object is to provide a device that is equipped with resilient means for insuring a quick disengagement. a further object of my invention is to provide a device which acts as a shaft coupling and automatically disengages itself under pressure.

The device illustrated, described, and claimed herein, is readily adaptable for many uses. It is simple in construction and highly efficient in its performance.

Other and further objects of my invention will become more apparent as the description proceeds, when taken in conjunction with the drawings, in which:

FIG. 1 is a perspective view of the entire assembled device;

FIG. 2 is a side view of the assembled device in an engaged position;

FIG. 3 is a similar view of the device (as shown in FIG. 2) in a disengaged position;

FIG. 4 is a longitudinal cross sectional view of the device in an engaged or driving position, taken along line 4—4 of FIG. 2;

FIG. 5 is a cross sectional view of a modified type of drive pin;

FIG. 6 is a view similar to that shown in FIG. 5, of another modified type of drive pin; and FIG. 7 is a cross sectional view taken along line 7—7 of FIG. 4.

Similar reference characters indicate corresponding parts and features throughout the several views. More particularly, the character 10 identifies a shaft portion threaded at 11 to accommodate an attachment unit 12, here shown as a hexagon nut held in a fixed position on the shaft by means of a cotter pin 13 extending through both the nut 12 and the shaft 10. Obviously, any other type of retaining means may also be employed.

Concentrically positioned around the shaft 10 is a tube 14 which has an inside diameter large enough to freely turn on the shaft 10. The outside of the tube 14 has splines or grooves which slide into mating keyways formed in the cylindrical member. The cross section of this concentric arrangement is shown in FIG. 7 by the tube 14, shaft 10, and splines 32. A cylindrical clutch member 15 is arranged to slide on the splines to the extreme right hand position, as viewed in FIG. 4, under the urging of springs 26. The tension in these springs 27 depends upon how tightly the nut 12 is drawn on the shaft 10. A number of pins 16 project radially away from the block 15. These pins are threaded into openings in the block 15. The pins 16 may be equipped with rollers 17, of any form, shape, or contour (FIGS. 5 and 6) mounted onto bearings 18, as shown. Thus, as the block 15 turns, the pins 16 turn also.

The splined or grooved portion 14 is mounted on the shaft 10 to support a driving means, shown as a V-belt pulley 19. Obviously this may also be a standard pulley or gear. It is shown as engaging a ball bearing rail 20, engaging a washer 21 adjacent to the surface of the nut 12.

A somewhat cup shaped cylindrical member 22 is keyed to turn with the shaft 10 at 23 (see FIG. 4). Member 22 telescopically contacts the member 15 (see FIG. 4) within the cup shaped cavity. A plurality of semicircular recesses 24 spaced and corresponding in number to the detents or pins 16 on the member 15 are formed in the top surface of member 22. Each recess 24 is equipped with a lug or latch 25 hingedly supported by a pin 26 having a hex-head recess. When an Allen wrench is fitted into the recess in pin 26 and turned, the latch 25 is raised to a capture position, as shown in FIGS. 1 and 2. When the latch 25 is in an open position (see FIGS. 2 and 4), it captures or engages the detents or pins 16. This driving position is shown in FIG. 2, where captured pins 16 are disposed within the recess 24. If power is applied to the pulley 19, the splines 32 cause the member 15 to rotate. The pins 16 are pressed into the recess 24 by the force of the springs 27. As a result, the member 22 and the shaft 10 turn.

If something stops the turning of the shaft 10, the pins 16 slip out from under the latches 25 and move over the surface of the latches 25. This presses the latches down into the recess 24. The drive pulley keeps on revolving without driving the shaft 10. The pins merely pass over the top of the closed latches 25. The slideable movement of the member 15 on the splined portion 14 is governed by the compression springs 27 disposed between the pulley 19 and the member 15, as shown.

Thus, it is seen that when rotation is in one direction under influence of the motor, the latches 25 catch the pins. If there is a jerk, the pins 16 pass over the latches 25 to escape the captured position.

Thereafter, the person using the machine tool may stop it and use an Allen wrench on pins 26 to move the latches 25 back out to a capture position. When power is again applied to turn the pulley 19, the springs 27 push the pins 16 into recess 24 with a force adaquate to transmit power from pulley 19 to shaft 10.

From the above description it will become apparent to anyone familiar with the art that the device is simple in construction and designed to perform the function for which it is intended. Although I have shown a specific construction and arrangement of the parts and features constituting my invention, I am fully aware that many changes may be made in the parts without effecting their operativeness. Accordingly, I reserve the right to make such changes as I may deem convenient or necessary without departing from the spirit of my invention or the scope of the appended claims.

I claim:

1. A quick acting, rotary power disconnect device for fuse-like removal of said rotary power from a driven shaft during shaft overload conditions,
    said device comprising two relative sliding members normally forced together under the urging of a spring means,
    first means on one of said members for imparting a rotary force to turn the other of said members,
    second means on the other of said members for receiving said force imparting means, and
    latch means for guiding said first and second means together during normal usage and for preventing said first and second means from coming together during said shaft overload conditions,
    wherein said first means comprises a first of said sliding members having a plurality of pins extending radially therefrom and said second means comprising recesses in the other of said sliding members,
    said recesses being shaped to receive said pins under the force of said spring means.

2. The device of claim 1 wherein said latch means comprises plurality of plates pivotally attached to said other member, said plates being near and individually associated with each of said recesses, said plates guiding said pins into said recess when said rotary power is first applied to said first member.

3. The device of claim 2 wherein an overload shaft condition causes said pins to slip out of said recesses and to move on to strike the plates to pivot them and to force them over said recesses for preventing said pin from again entering said recesses.

4. The device of claim 3 and a pair of concentric shafts with one of said shafts turning inside the other of said shafts, splines on the outer of said shafts, and
   means for sliding one of said members along said splines toward or away from the other of said members, said other member being keyed to the inner shaft.

5. The device of claim 3 and means for adjusting the force required for said pins to slip out of said recesses.

6. The device of claim 5 wherein said force adjusting means comprises means for adjusting the tension on said spring.

7. The device of claim 6 and a pair of concentric shafts with one of said shafts turning inside the other of said shafts, splines on the outer of said shafts, and
   means for sliding one of said members along said splines toward or away from the other of said members, said other member being keyed to the inner shaft under the urging of said spring.

* * * * *